US012010055B2

(12) United States Patent
Sun et al.

(10) Patent No.: US 12,010,055 B2
(45) Date of Patent: Jun. 11, 2024

(54) RESOURCE COUNTING FOR REFERENCE SIGNALS

(71) Applicant: Apple Inc., Cupertino, CA (US)

(72) Inventors: Haitong Sun, Cupertino, CA (US); Gokhan Ozer, Munich (DE); Yeong-Sun Hwang, Germering (DE); Yushu Zhang, Beijing (CN); Wei Zeng, Saratoga, CA (US); Dawei Zhang, Saratoga, CA (US); Manasa Raghavan, Sunnyvale, CA (US); Jie Cui, San Jose, CA (US); Weidong Yang, San Diego, CA (US); Amir Aminzadeh Gohari, Sunnyvale, CA (US); Ghaith N. Hattab, Santa Clara, CA (US); Yang Tang, San Jose, CA (US); Ismael Gutierrez Gonzalez, San Jose, CA (US); Ziyang Ju, Munich (DE)

(73) Assignee: Apple Inc., Cupertino, CA (US)

( * ) Notice: Subject to any disclaimer, the term of this patent is extended or adjusted under 35 U.S.C. 154(b) by 340 days.

(21) Appl. No.: 17/437,750

(22) PCT Filed: Mar. 31, 2021

(86) PCT No.: PCT/CN2021/084291
§ 371 (c)(1),
(2) Date: Sep. 9, 2021

(87) PCT Pub. No.: WO2022/205036
PCT Pub. Date: Oct. 6, 2022

(65) Prior Publication Data
US 2023/0016376 A1 Jan. 19, 2023

(51) Int. Cl.
*H04L 5/00* (2006.01)
*H04B 7/06* (2006.01)
(Continued)

(52) U.S. Cl.
CPC ......... *H04L 5/0048* (2013.01); *H04B 7/0632* (2013.01); *H04B 7/0695* (2013.01);
(Continued)

(58) Field of Classification Search
CPC ..... H04L 5/003; H04L 5/0048; H04L 5/0091; H04L 5/0094; H04L 2025/03783;
(Continued)

(56) References Cited

U.S. PATENT DOCUMENTS

| 11,800,391 | B2 * | 10/2023 | Zhu ........................ H04W 24/10 |
| 2015/0016386 | A1 * | 1/2015 | Tamrakar .............. H04L 5/0053 370/329 |

(Continued)

FOREIGN PATENT DOCUMENTS

| CA | 3035020 A1 * | 5/2019 | ........... H04B 17/309 |
| CN | 115485985 * | 12/2022 | ............... H04B 7/06 |

(Continued)

OTHER PUBLICATIONS

International Search Report and Written Opinion for PCT/CN2021/084291; 10 pages; dated Dec. 30, 2021.
(Continued)

*Primary Examiner* — Warner Wong
(74) *Attorney, Agent, or Firm* — Kowert, Hood, Munyon, Rankin & Goetzel, P.C.

(57) ABSTRACT

This disclosure relates to techniques for performing wireless communications including exchanging information related to capability of processing reference signals. A user equipment device may provide capability information to a network. The capability information may indicate a number of reference signal resources that the user equipment device can process in a slot or other defined period of time. The user equipment device and the network may share a common set of definitions, counting rules, and approaches for interpret-
(Continued)

ing the capability information. The network may configure reference signals for the user equipment device.

20 Claims, 4 Drawing Sheets

(51) Int. Cl.
    *H04L 25/03*     (2006.01)
    *H04L 27/26*     (2006.01)
    *H04L 41/08*     (2022.01)
    *H04L 69/24*     (2022.01)
    *H04W 28/16*     (2009.01)

(52) U.S. Cl.
    CPC .. *H04L 5/0094* (2013.01); *H04L 2025/03783* (2013.01); *H04L 27/261* (2013.01); *H04L 41/08* (2013.01); *H04L 69/24* (2013.01); *H04W 28/16* (2013.01)

(58) Field of Classification Search
    CPC ..... H04L 27/261; H04L 47/748; H04L 69/24; H04L 41/08; H04L 41/0803; H04L 41/0866–0873; H04B 7/0621; H04B 7/0632; H04B 7/0686; H04B 7/0695; H04W 28/16; H04W 28/18
    See application file for complete search history.

(56) References Cited

U.S. PATENT DOCUMENTS

| | | |
|---|---|---|
| 2018/0123772 A1 | 5/2018 | Wang et al. |
| 2018/0270032 A1 | 9/2018 | Li et al. |
| 2019/0053212 A1* | 2/2019 | Liu ........................ H04L 5/0091 |
| 2019/0103949 A1* | 4/2019 | Harrison ............... H04B 7/0456 |
| 2019/0261345 A1 | 8/2019 | Shi et al. |
| 2019/0288751 A1 | 9/2019 | Jin et al. |
| 2020/0235802 A1* | 7/2020 | Nilsson ............... H04L 25/0226 |
| 2023/0073090 A1* | 3/2023 | Harrison ............... H04W 72/21 |
| 2023/0361832 A1* | 11/2023 | Hao ..................... H04B 7/0456 |

FOREIGN PATENT DOCUMENTS

| | | | |
|---|---|---|---|
| WO | 2017111494 A1 | 6/2017 | |
| WO | WO-2020222956 A1 * | 11/2020 | ........... G01S 5/0236 |

OTHER PUBLICATIONS

Intel Corporation "Remaining Issuers on BEAM Management"; 3GPP TSG RAN WG1 Meeting #94 R1-1808669; Gothenburg, Sweden; 16 pages; Aug. 24, 2018.

\* cited by examiner

RESOURCE COUNTING FOR REFERENCE SIGNALS

PRIORITY CLAIM INFORMATION

This application is a U.S. National Stage application of International Application No. PCT/CN2021/084291, filed Mar. 31, 2021, titled "Resource Counting for Reference Signals", which is hereby incorporated by reference in its entirety.

TECHNICAL FIELD

The present application relates to wireless communication, including to counting resources in relation to reference signals such as channel state information reference signals.

DESCRIPTION OF THE RELATED ART

Wireless communication systems are rapidly growing in usage. Further, wireless communication technology has evolved from voice-only communications to also include the transmission of data, such as Internet and multimedia content.

Mobile electronic devices may take the form of smart phones or tablets that a user typically carries. Wearable devices (also referred to as accessory devices) are a newer form of mobile electronic device, one example being smart watches. Additionally, low-cost, low-complexity wireless devices intended for stationary or nomadic deployment are also proliferating as part of the developing "Internet of Things". In other words, there is an increasingly wide range of desired device complexities, capabilities, traffic patterns, and other characteristics. In general, it would be desirable to recognize and provide improved support for a broad range of desired wireless communication characteristics. One characteristic may be that different mobile electronic devices have different capabilities for processing channel state information reference signals. Improvements in the field are desired.

SUMMARY

Embodiments are presented herein of, inter alia, systems, apparatuses, and methods for exchanging information about reference signals in a wireless communication system.

As noted above, the number of use cases for wireless networks communicating with different classes of user equipment devices (UEs) with widely variable capabilities and usage expectations are growing. One direction in expansion of possible use cases supported by wireless communication techniques may include increasing use of techniques for beam management. Beam management may include measurements using reference signals.

In some embodiments, a user equipment device (UE) may: establish communication with a base station; determine a first number of reference signal resources that the UE is capable of processing during an amount of time for a beam management measurement using a second number of ports, wherein the first number of reference signal resources is determined based on a function of the second number of ports and is different than a third number of reference signal resources that the UE is capable of processing during the amount of time for the beam management measurement using a single port; transmit, to the base station, an indication of the first number of reference signal resources; receive, from the base station, configuration information for the beam management measurement using the second number of ports; receive, from the base station, a reference signal using the second number of ports; and perform the beam management measurement based on the reference signal.

In some embodiments, a base station may: establish communication with a user equipment device (UE); receive, from the UE, a message including an indication of a capability of the UE for the maximum number of reference signals that the UE can process during a period of time using a single port; determine a configured number of reference signals using a larger number of ports that the UE can process during the period of time, wherein the determination of the configured number of reference signals is based on the indication and a function of the larger number of ports, wherein the larger number of ports is greater than one; and transmit the configured number of reference signals to the UE during the period of time.

In some embodiments, a user equipment device (UE) may: establish communication with a base station; determine: a first number of reference signal resources that the UE is capable of processing during an amount of time for a beam management measurement; and a second number of ports that the UE is capable of processing during the amount of time for the beam management measurement, wherein the second number is greater than one; transmit, to the base station: an indication of the first number of reference signal resources; and an indication of the second number of ports; receive, from the base station, a reference signal using the second number of ports; and perform the beam management measurement based on the reference signal.

The techniques described herein may be implemented in and/or used with a number of different types of devices, including but not limited to mobile telephones or smart phones (e.g., iPhone™, Android™-based phones), tablet computers (e.g., iPad™, Samsung Galaxy™) portable gaming devices (e.g., Nintendo DS™, PlayStation Portable™, Gameboy Advance™ iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, other cellular network infrastructure equipment, servers, and any of various other computing devices.

This summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the embodiments is considered in conjunction with the following drawings.

Figure 1:
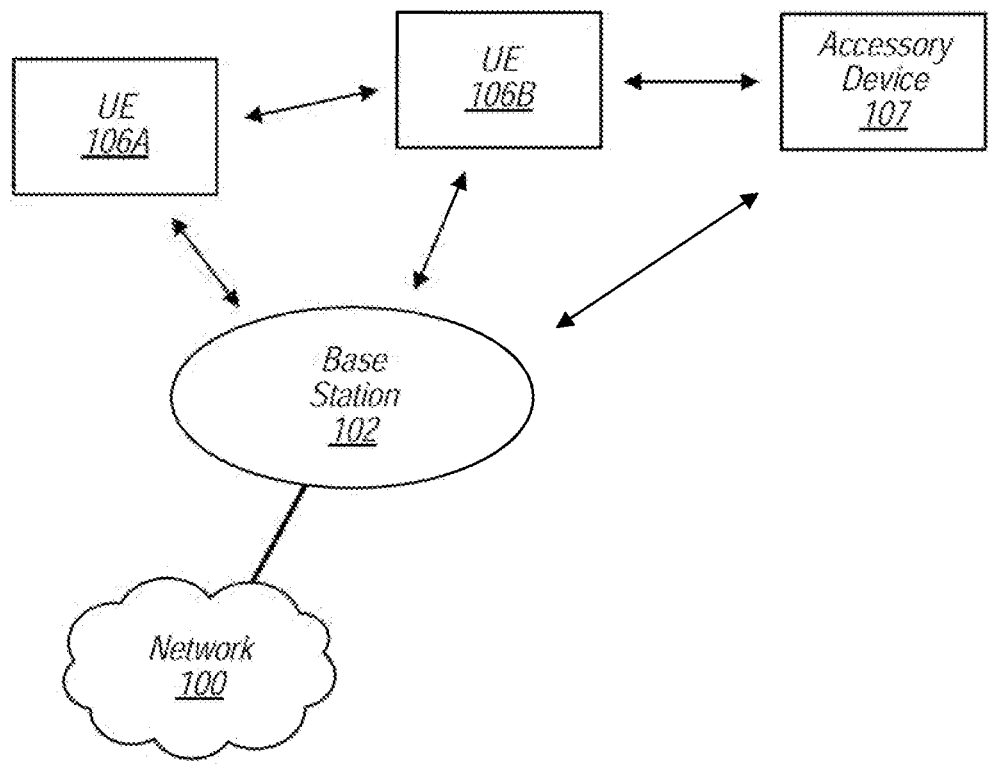
FIG. 1 illustrates an example wireless communication system including an accessory device, according to some embodiments.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms and Abbreviations

The following acronyms and abbreviations are used in the present disclosure.

3GPP: Third Generation Partnership Project
3GPP2: Third Generation Partnership Project 2
GSM: Global System for Mobile Communications
UMTS: Universal Mobile Telecommunications System
NR: New Radio
LTE: Long Term Evolution
RRC: Radio Resource Control
MAC: Media Access Control
CE: Control Element
RS: Reference Signal
CSI: Channel State Information
DL: Downlink
UL: Uplink Terminology The following are definitions of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, Play Station Portable™, Gameboy Advance™, iPhone™), wearable devices (e.g., smart watch, smart glasses), laptops, PDAs, portable Internet devices, music players, data storage devices, other handheld devices, vehicle, automobile, unmanned aerial vehicles (e.g., drones) and unmanned aerial controllers, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless communication system.

Link Budget Limited—includes the full breadth of its ordinary meaning, and at least includes a characteristic of a wireless device (e.g., a UE) which exhibits limited communication capabilities, or limited power, relative to a device that is not link budget limited, or relative to devices for which a radio access technology (RAT) standard has been developed. A wireless device that is link budget limited may experience relatively limited reception and/or transmission capabilities, which may be due to one or more factors such as device design, device size, battery size, antenna size or design, transmit power, receive power, current transmission medium conditions, and/or other factors. Such devices may be referred to herein as "link budget limited" (or "link budget constrained") devices. A device may be inherently link budget limited due to its size, battery power, and/or transmit/receive power. For example, a smart watch that is communicating over LTE or LTE-A with a base station may be inherently link budget limited due to its reduced transmit/receive power and/or reduced antenna. Wearable devices, such as smart watches, are generally link budget limited devices. Alternatively, a device may not be inherently link budget limited, e.g., may have sufficient size, battery power, and/or transmit/receive power for normal communications over LTE or LTE-A, but may be temporarily link budget limited due to current communication conditions, e.g., a smart phone being at the edge of a cell, etc. It is noted that the term "link budget limited" includes or encompasses power limitations, and thus a power limited device may be considered a link budget limited device.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well as any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus, the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
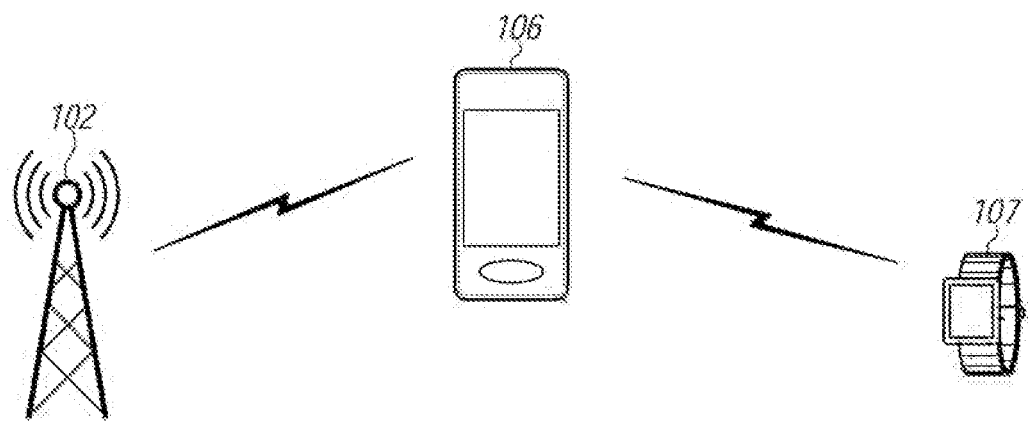
FIG. 2 illustrates an example wireless communication system in which two wireless devices can perform direct device-to-device communication, according to some embodiments.

FIGS. 1-2—Wireless Communication System

FIG. 1 illustrates an example of a wireless cellular communication system. It is noted that FIG. 1 represents one possibility among many, and that features of the present disclosure may be implemented in any of various systems, as desired. For example, embodiments described herein may be implemented in any type of wireless device.

As shown, the exemplary wireless communication system includes a cellular base station 102, which communicates over a transmission medium with one or more wireless devices 106A, 106B, etc., as well as accessory device 107. Wireless devices 106A, 106B, and 107 may be user devices, which may be referred to herein as "user equipment" (UE) or UE devices.

The base station 102 may be a base transceiver station (BTS) or cell site, and may include hardware and/or software that enables wireless communication with the UE devices 106A, 106B, and 107. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the UE devices 106 and 107 and/or between the UE devices 106/107 and the network 100. As also used herein, from the perspective of UEs, a base station may sometimes be considered as representing the network insofar as uplink (UL) and downlink (DL) communications of the UE are concerned. Thus, a UE communicating with one or more base stations in the network may also be interpreted as the UE communicating with the network.

In other implementations, base station 102 can be configured to provide communications over one or more other wireless technologies, such as an access point supporting one or more WLAN protocols, such as 802.11 a, b, g, n, ac, ad, and/or ax, or LTE in an unlicensed band (LAA).

The communication area (or coverage area) of the base station 102 may be referred to as a "cell." The base station 102 and the UEs 106/107 may be configured to communicate over the transmission medium using any of various radio access technologies (RATs) or wireless communication technologies, such as GSM, UMTS (WCDMA, TDS-CDMA), LTE, LTE-Advanced (LTE-A), NR, HSPA, 3GPP2 CDMA2000 (e.g., 1×RTT, 1×EV-DO, HRPD, eHRPD), Wi-Fi, etc.

Base station 102 and other similar base stations (not shown) operating according to one or more cellular communication technologies may thus be provided as a network of cells, which may provide continuous or nearly continuous overlapping service to UE devices 106A-N and 107 and similar devices over a geographic area via one or more cellular communication technologies.

Note that at least in some instances a UE device 106/107 may be capable of communicating using any of multiple wireless communication technologies. For example, a UE device 106/107 might be configured to communicate using one or more of GSM, UMTS, CDMA2000, LTE, LTE-A, NR, WLAN, Bluetooth, one or more global navigational satellite systems (GNSS, e.g., GPS or GLONASS), one and/or more mobile television broadcasting standards (e.g., ATSC-M/H), etc. Other combinations of wireless communication technologies (including more than two wireless communication technologies) are also possible. Likewise, in some instances a UE device 106/107 may be configured to communicate using only a single wireless communication technology.

The UEs 106A and 106B may include handheld devices such as smart phones or tablets, and/or may include any of various types of device with cellular communications capability. For example, one or more of the UEs 106A and 106B may be a wireless device intended for stationary or nomadic deployment such as an appliance, measurement device, control device, etc. The UE 106B may be configured to communicate with the UE device 107, which may be referred to as an accessory device 107. The accessory device 107 may be any of various types of wireless devices, typically a wearable device that has a smaller form factor, and may have limited battery, output power and/or communications abilities relative to UEs 106. As one common example, the UE 106B may be a smart phone carried by a user, and the accessory device 107 may be a smart watch worn by that same user. The UE 106B and the accessory device 107 may communicate using any of various short range communication protocols, such as Bluetooth or Wi-Fi. In some instances, the UE 106B and the accessory device 107 may perform direct peer-to-peer communication using proximity services (ProSe) techniques, e.g., in a manner supported by a cellular base station. For example, such ProSe communication may be performed as part of a relay link to support a radio resource control connection between the accessory device 107 and the BS 102, such as according to various embodiments described herein.

The UE 106B may also be configured to communicate with the UE 106A. For example, the UE 106A and UE 106B may be capable of performing direct device-to-device (D2D) communication. The D2D communication may be supported by the cellular base station 102 (e.g., the BS 102 may facilitate discovery, among various possible forms of assistance), or may be performed in a manner unsupported by the BS 102. For example, it may be the case that the UE 106A and UE 106B are capable of arranging and performing D2D communication (e.g., including discovery communications) with each other even when out-of-coverage of the BS 102 and other cellular base stations.

The BS 102 may control one or more transmission and reception points (TRPs) and may use the TRPs to communicate with the UEs. The TRPs may be collocated with the BS and/or at separate physical locations.

FIG. 2 illustrates an example BS 102 in communication with a UE device 106, which in turn is in communication with an accessory device 107. The UE device 106 and accessory device 107 may be any of a mobile phone, a tablet, or any other type of hand-held device, a smart watch or other wearable device, a media player, a computer, a laptop, unmanned aerial vehicle (UAV), unmanned aerial controller, vehicle, or virtually any type of wireless device. In some embodiments, the accessory device may be a wireless device designed to have low cost and/or low power consumption, and which may benefit from use of a relay link with the UE device 106 (and/or another companion device) to support communication with the BS 102. A device that utilizes a relay link with another wireless device to communicate with a cellular base station, such as in the illustrated scenario of FIG. 2, may also be referred to herein as a remote wireless device, a remote device, or a remote UE device, while a wireless device that provides such a relay link may also be referred to herein as a relay wireless device, a relay device, or relay UE device. According to some embodiments, such a BS 102, UE 106, and accessory device 107 may be configured to perform radio resource control procedures for remote wireless devices in accordance with various of the techniques described herein.

The UE 106 and accessory device 107 may each include a device or integrated circuit for facilitating cellular communication, referred to as a cellular modem. The cellular modem may include one or more processors (processing elements) that is configured to execute program instructions stored in memory, and/or various hardware components as described herein. The UE 106 and/or accessory device 107 may each perform any of the method embodiments described herein by executing such stored instructions. Alternatively, or in addition, the UE 106 and/or accessory device 107 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The cellular modem described herein may be used in a UE device as defined herein, a wireless device as defined herein, or a communication device as defined herein. The cellular modem described herein may also be used in a base station or other similar network side device.

The UE 106 and/or accessory device 107 may include one or more antennas for communicating using one or more wireless communication protocols according to one or more RAT standards. In some embodiments, one or both of the UE 106 or accessory device 107 might be configured to communicate using a single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

Alternatively, the UE 106 and/or accessory device 107 may include two or more radios. For example, in some embodiments, the UE 106 and/or accessory device 107 may include separate transmit and/or receive chains (e.g., including separate antennas and other radio components) for each wireless communication protocol with which it is configured to communicate. As a further possibility, the UE 106 and/or accessory device 107 may include one or more radios that are shared between multiple wireless communication protocols, and one or more radios that are used exclusively by a single wireless communication protocol. For example, the UE 106 and/or accessory device 107 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
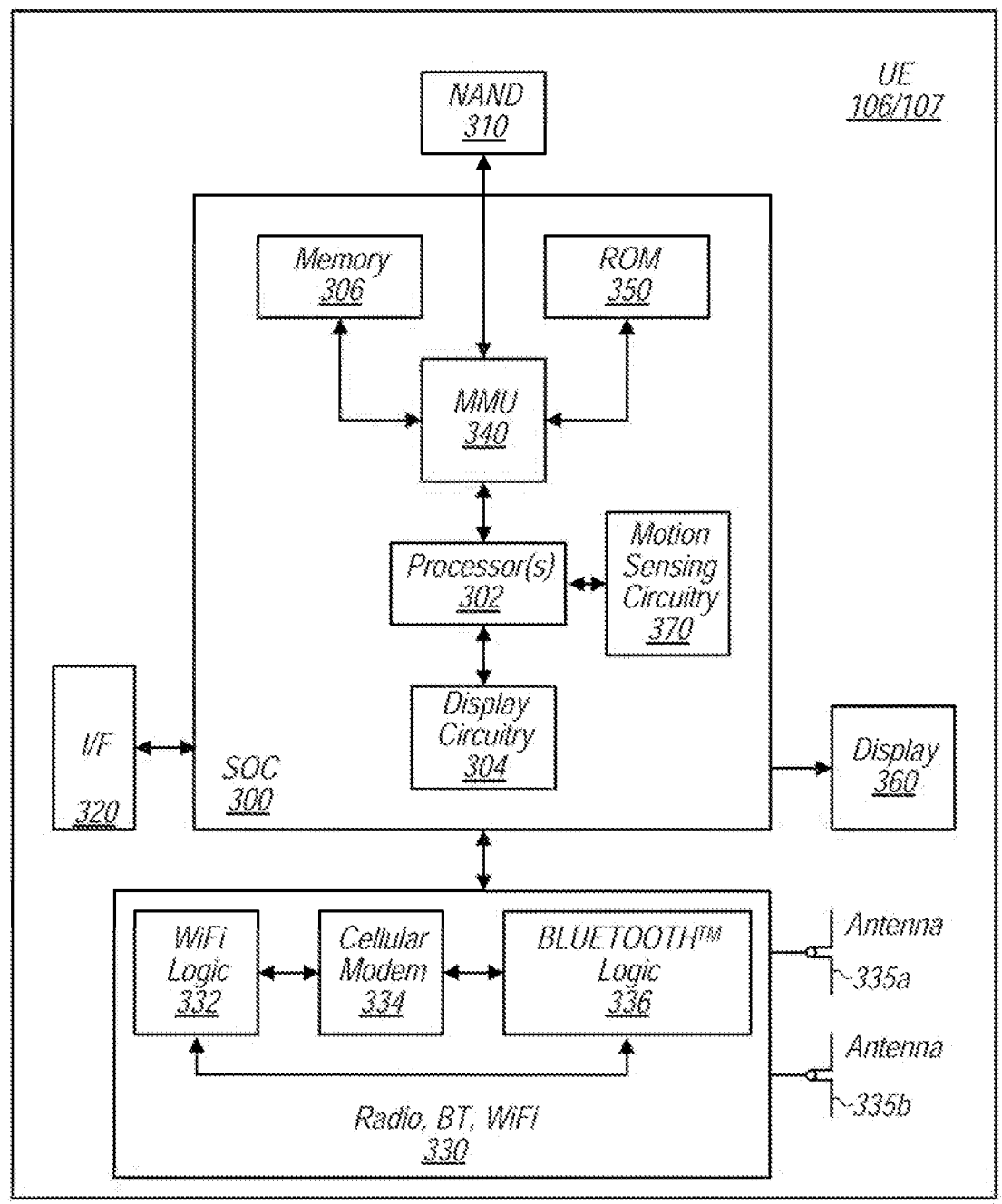
FIG. 3 is a block diagram illustrating an example wireless device, according to some embodiments.

FIG. 3—Block Diagram of a UE Device

FIG. 3 illustrates one possible block diagram of a UE device, such as UE device 106 or 107. As shown, the UE device 106/107 may include a system on chip (SOC) 300, which may include portions for various purposes. For example, as shown, the SOC 300 may include processor(s) 302 which may execute program instructions for the UE device 106/107, and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, flash memory 310), and/or to other circuits or devices, such as the display circuitry 304, radio 330, I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106/107. For example, the UE 106/107 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, Bluetooth, Wi-Fi, NFC, GPS, etc.).

The UE device 106/107 may include at least one antenna, and in some embodiments multiple antennas 335a and 335b, for performing wireless communication with base stations and/or other devices. For example, the UE device 106/107 may use antennas 335a and 335b to perform the wireless communication. As noted above, the UE device 106/107 may in some embodiments be configured to communicate wirelessly using multiple wireless communication standards or radio access technologies (RATs).

The wireless communication circuitry 330 may include Wi-Fi Logic 332, a Cellular Modem 334, and Bluetooth Logic 336. The Wi-Fi Logic 332 is for enabling the UE device 106/107 to perform Wi-Fi communications on an 802.11 network. The Bluetooth Logic 336 is for enabling the UE device 106/107 to perform Bluetooth communications. The cellular modem 334 may be a lower power cellular modem capable of performing cellular communication according to one or more cellular communication technologies.

As described herein, UE 106/107 may include hardware and software components for implementing embodiments of this disclosure. The processor(s) 302 of the UE device 106/107 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform radio resource control procedures for remote wireless devices according to various embodiments disclosed herein. Processor(s) 302 may also implement various other applications and/or end-user applications running on UE 106. Alternatively or additionally, one or more components of the wireless communication circuitry 330 (e.g., cellular modem 334) of the UE device 106/107 may be configured to implement part or all of the methods described herein, e.g., by a processor executing program instructions stored on a memory medium (e.g., a non-transitory computer-readable memory medium), a processor configured as an FPGA (Field Programmable Gate Array), and/or using dedicated hardware components, which may include an ASIC (Application Specific Integrated Circuit).

Figure 4:
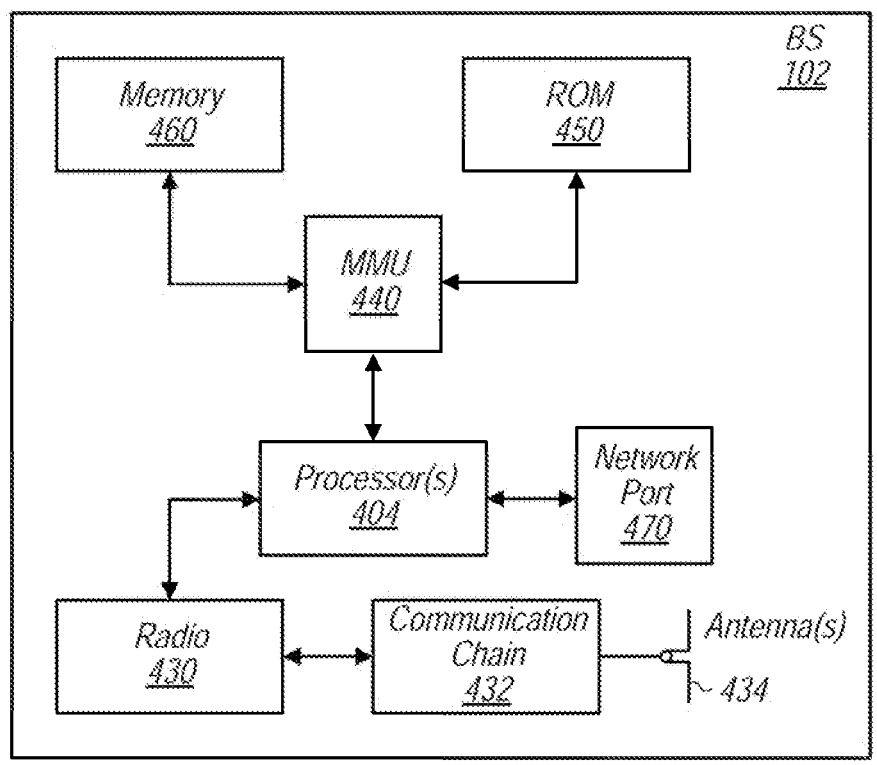
FIG. 4 is a block diagram illustrating an example base station, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106/107, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106/107. For example, the core network may include a mobility management entity (MME), e.g., for providing mobility management services, a serving gateway (SGW) and/or packet data network gateway (PGW), e.g., for providing external data connections such as to the Internet, etc. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106/107 via radio 430. The antenna(s) 434 communicates with the radio 430 via communication chain 432. Communication chain 432 may be a receive chain, a transmit chain or both. The radio 430 may be configured to communicate via various wireless communication standards, including, but not limited to, LTE, LTE-A, NR, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a Wi-Fi radio for performing communication according to Wi-Fi. In such a case, the base station 102 may be capable of operating as both an LTE base station and a Wi-Fi access point. As another possibility, the base station 102 may include a multi-mode radio which is capable of performing communications according to any of multiple wireless communication technologies (e.g., LTE and NR, LTE and Wi-Fi, LTE and UMTS, LTE and CDMA2000, UMTS and GSM, etc.).

As described further subsequently herein, the BS 102 may include hardware and software components for implementing or supporting implementation of features described herein. According to some embodiments, the processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of radio resource control procedures for remote wireless devices according to various embodiments disclosed herein, and/or any of various other of the features described herein.

Reference Signals and Measurements

Channel state information (CSI) processing may rely on significant calculations (e.g., and therefore processing requirements) for NR. There may be two categories of the UE processing capability (e.g., as defined in 38.822, 38.306 and 38.331). A first category may be link adaptation CSI (LA-CSI), e.g., as described in: 3GPP release (Rel)-15 multiple-input multiple-output (MIMO) codebook related feature groups (FG): FG2-36, FG2-40, FG2-41 and FG2-43; Rel-16 MIMO codebook related: FG16-3a, FG16-3a-1, FG16-3b, FG16-3b-1; Concurrent MIMO codebook: FG16-8; and Total LA-CSI related: FG2-33.

A second category may be beam Management CSI (BM-CSI), e.g., as described in: Layer 1 (L1) reference signal received power (RSRP): FG2-24; candidate beam for beam failure recovery (BFR): FG2-31; L1-signal to interference and noise ratio (SINR): FG16-1a-1; and Total BM-CSI related, including L1-SINR, L1-RSRP, Pathloss (PL) RS, BFD RS, Candidate Beam Detection (CBD) RS, and Radio Link Monitoring (RLM) RS: FG16-1g and FG16-1g-1.

The CSI reference resource (RS) related UE capability may be considered in two categories: UE processing complexity related, e.g., the maximum number of RS a UE can handle simultaneously within a reference slot or other time period; or UE memory related, e.g., a maximum number of RS that can be configured for the UE.

UE memory related capabilities may be relatively well defined for both LA-CSI and BM-CSI. UE processing complexity related may be considered relatively well defined for LA-CSI, but not well defined for BM-CSI.

As noted above, RS may be used for BM measurements. BM measurements with more than 1 port may have certain limitations. For BFD and/or RLM RS: only single port RS may be configured, according to some embodiments. For CBD, 1-port or 2-port RS may be configured, according to some embodiments. For L1-SINR, L1-RSRP: 1-port or 2-port RS may be configured, and such configuration may be a UE optional feature, according to some embodiments. For PL RS, 3GPP TS 38.215 may configure a UE to measure on one CSI-RS port (e.g., port 3000), but the network may perform RS sharing, e.g., configure more than 1-port CSI-RS.

Figure 5:
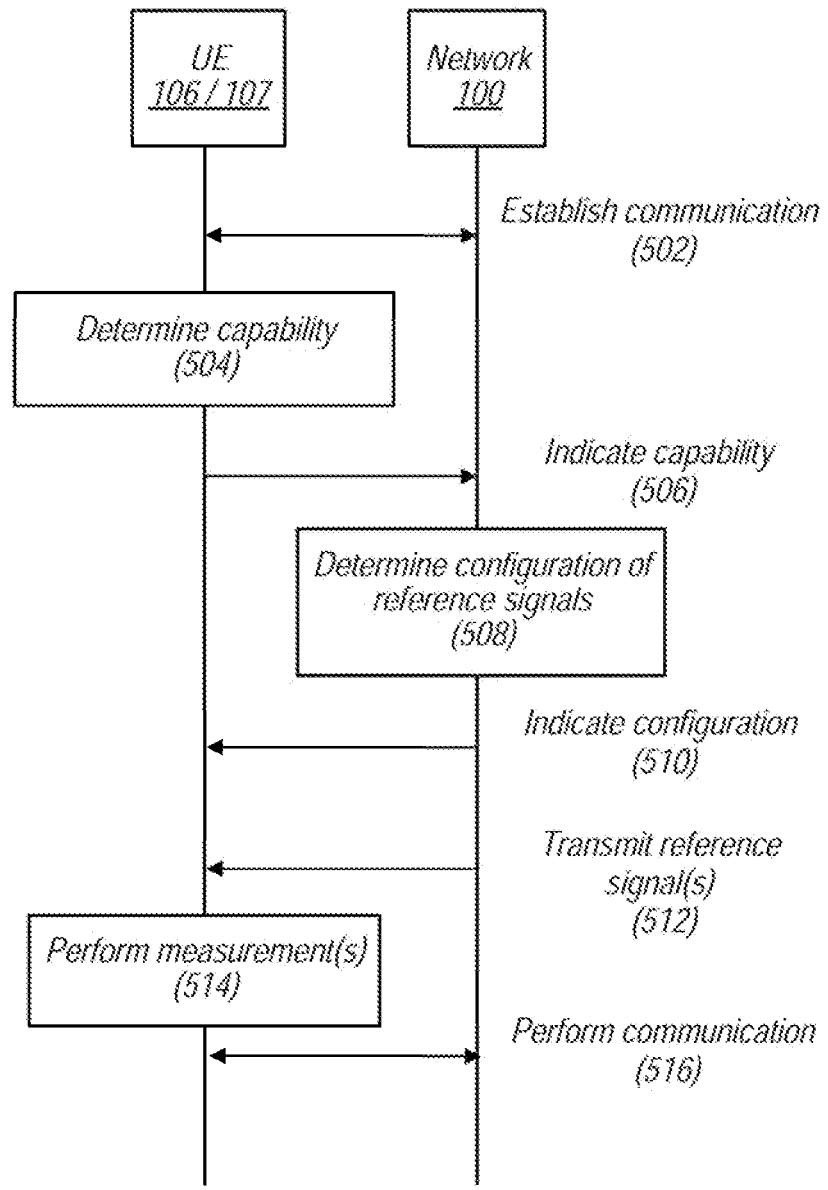
FIG. 5 is a communication flow diagram illustrating an example method for configuring reference signals, according to some embodiments.

FIG. 5—Communication Flow Diagram

FIG. 5 is a communication flow diagram illustrating an example method for communicating capabilities related to reference signals (RS), according to some embodiments. Aspects of the method of FIG. 5 may be relevant to processing complexity related capability for (e.g., BM-CSI) reference signals with more than 1 port, among various possibilities. In particular, the method of FIG. 5 may relate to counting RS resources associated with multiple ports in relation to the UE capability.

In various embodiments, some of the elements of the methods shown may be performed concurrently, in a different order than shown, may be substituted for by other method elements, or may be omitted. Additional method elements may also be performed as desired.

Aspects of the method of FIG. 5 may be implemented by a UE, such as the UEs 106 or 107, a cellular network (e.g., network 100), and/or one or more BS 102, e.g., as illustrated in and described with respect to the Figures, or more generally in conjunction with any of the computer systems, circuitry, elements, components or devices shown in the Figures, among other devices, as desired. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network, network element, and/or BS to perform some or all of the illustrated method elements. Note that while at least some elements of the method of FIG. 5 are described in a manner relating to the use of communication techniques and/or features associated with LTE, NR, and/or 3GPP specification documents, such description is not intended to be limiting to the disclosure, and aspects of the method of FIG. 5 may be used in any suitable wireless communication system, as desired. Similarly, while various examples provided herein relate to channel state information (CSI)-RS or synchronization signal block (SSB) for one or more beam management measurements, it will be appreciated that aspects of the method of FIG. 5 may be used with respect to different types of RS and/or measurements. Actions discussed herein as being performed by a network may be performed by a base station and/or network element of the network. As shown, the method may operate as follows.

The UE and the network (e.g., base station) may establish communication (502), according to some embodiments. The UE and the network may communicate using one or more radio access technologies (RATs), e.g., including NR. The network may exchange configuration information with the UE. For example, the network may use radio resource control (RRC) and/or other higher layer signaling to configure the UE.

Among various possibilities, the network may indicate to the UE to provide capability information. For example, the capability information may include or relate to the UE's capabilities for receiving and/or processing RS, e.g., channel state information (CSI)-RS and/or SSB, for one or more beam management measurements using multiple ports.

Alternatively, the UE may be configured to provide the capability information without a request from the network.

In some embodiments, the configuration may include any relevant definitions, counting rule, or other approach for the UE to use in determining and/or indicating the capability information to the network. Alternatively, or additionally, such definitions, counting rule, or other approach may be specified in a wireless standard and may be known to both the UE and the network, as desired.

In some embodiments, the network may provide configuration information related to CSI reporting settings. Such settings may include which measurement type(s)/quantity(s) (e.g., interference (SNR, SINR, etc.), channel measurement, signal power (RSRP, etc.), etc.) should be reported by the UE and relevant parameters, e.g., which may differ for different measurement type(s)/quantity(s). For example, an RS configuration for channel measurement, an RS configuration for the interference measurement, and, UE interference hypothesis testing assumptions, etc. may be included, among various possibilities. Further, the setting may include which RS or types of RS may be used for various measurement type(s)/quantity(s).

In some embodiments, the network may provide configuration information related to reporting beam management (BM) measurements. For example, the configuration may indicate that the UE should report measurements in a table, by indices, or in any other report format or combination thereof.

In some embodiments, the network may provide configuration information related to any assumption(s) (e.g., an assumed number of ports or multiple assumed numbers of ports) that the UE should consider for reporting capability information. For example, the network may indicate a number of ports to use for a particular BM measurement or the network may indicate a type of coding (e.g., an orthogonal cover code (OCC) order, code division multiplexing (CDM) order, cdm-Type, etc.). Alternatively, the network may provide one or more potential configurations for the UE to consider for reporting capability information. The assumption(s) may be the same for multiple measurements or may be specific to a particular measurement type or types. In some embodiments, such an assumption(s) numbers may be established by a wireless standard and known to both the UE and the network.

In some embodiments, the network may provide configuration information related to a maximum number of ports that may be used for various measurement types and/or RS types. Different (or the same) maximum numbers of ports may be configured for different measurements or RS types. For example, a first maximum number of ports may be configured for pathloss (PL) measurement and a second number may be configured for RSRP measurement. The second number may be the same or different than the first number. For example, the first or second number may be 2, 4, or 8, among various possibilities. In some embodiments, such maximum numbers may be established by a wireless standard and known to both the UE and the network. Such maximum numbers may be an example of the assumptions discussed in the previous paragraph.

The UE may determine one or more capabilities (504), according to some embodiments. For example, the UE may determine a number of RS resources for one or more measurements, e.g., as further discussed below. Such a determination may be in response to a request for the information from the network or may be initiated by the UE (e.g., in association with a request to perform a beam management measurement or other function). Such a determination may be performed according to configuration information provided by the network. For example, such a determination may use any definition(s), counting rule(s), or other approach(es) indicated by the configuration information. Further, such a determination may be performed according to a wireless standard, e.g., which may contain any relevant assumptions, maximum numbers of ports, definitions, counting rule, or other approach, etc. The determination of capability may be based on such information, e.g., provided in configuration information and/or a wireless standard.

In some embodiments, the UE may determine assumptions and/or maximum values to use for determining capability information. For example, the UE may determine an assumed and/or maximum number of ports that may be used for various measurement types and/or RS types. In other words, in addition to or instead of such assumed or maximum value(s) being determined by the network or a wireless standard as discussed above (e.g., with respect to 502), the UE may determine the maximum(s). As noted above, different (or the same) assumed/maximum numbers of ports may be configured for different measurements or RS types. In some embodiments, an assumed/maximum value(s) may be established by the network or a wireless standard and the UE may establish a different (e.g., lower, e.g., UE-specific) assumed/maximum value(s). Thus, the UE may determine the assumed/maximum number(s) of ports to use for determining the number(s) of RS resources that may be used for measurement(s). The assumption(s) may be different (e.g., less than or equal to) any determined maximum value (e.g., if a relevant maximum is determined).

The UE may determine a processing complexity related capability for beam management (BM) RS (e.g., BM-CSI) and/or related measurements. For example, the UE may determine how many RS resources the UE can receive and process for a given number of ports (e.g., during a given time period such as a slot, subframe, or symbol, etc.). Such a given number of ports may be determined based on the control information and/or wireless standards. For example, such a given number may be a maximum number or a provided assumed number, e.g., as discussed above.

For purposes of determining the capability and communicating about the capability, a RS may be counted as one RS resource or as multiple RS resources, e.g., depending on the number of ports, usage, and/or other factors as further described below. The UE may determine a number of RS resources that the UE can receive and process as a function of the number of ports and/or other information. In other words, the number of RS resources may depend on the number of ports and/or other factors. The UE may determine the number of RS resources using an RS counting rule, e.g., which may represent or relate to the function of the number of ports and/or other information.

The UE may determine different numbers of RS resources (e.g., a number of times that a RS is counted) for different numbers of ports, different measurements, different feature groups (FG), and/or different amounts of time. In other words, a single instance of an RS may be counted different numbers of times (e.g., as one or more RS resources) based on various factors (e.g., number of ports, measurement type, etc.). For example, the processing capability limitations of the UE may relate to the process of spreading the RS to the different ports, e.g., which may be counted as multiple RS resources according to some embodiments. Thus, for some types of measurements, the UE may perform measurements with all configured ports while for other measurement types, the UE may perform measurements for only some of the configured ports. For example, the UE may determine that it can receive and process up to 2 RS resources for a measurement of pathloss with each RS resource containing 4 ports during a slot or up to 1 RS resources for a measurement of pathloss with each RS resource containing 8 ports during a slot. Further, in the example, the UE may determine that it can receive and process up to 4 RS resources for a measurement of layer 1 (L1) reference signal received power (RSRP) with 2 ports during a slot or up to 8 RS resources for a measurement of RSRP with each RS resource containing 1 port during a slot.

In some embodiments, the UE may determine a number of RS resources that it can receive process for a configured maximum number (e.g., indicated by configuration information as in 502) of ports for one or more measurement type or other purpose.

In some embodiments, the number of resources may be determined for (or in relation to) one or more of the following FGs, among various possibilities: FG16-1g: "Resources for beam management, pathloss measurement, BFD, RLM and new beam identification"; FG16-1g-1: "Resources for beam management, pathloss measurement, BFD, RLM and new beam identification across frequency ranges"; F G16-1a-1: "SSB/CSI-RS for L1-SINR measurement"; and FG2-24: "SSB/CSI-RS for beam measurement".

In some embodiments, when CSI-RS is configured with more than 1-port, regardless of how many ports UE may actually measure, the corresponding CSI-RS may be counted multiple times.

As one embodiment, the number of RS resources may be based on an orthogonal cover code (OCC) order. For example, the OCC order may be based on a product of a frequency domain (FD) OCC order and a time domain (TD) OCC order. The OCC order may be further based on a code division multiplexing (CDM) order, e.g., in addition to or instead of the FD and/or TDD OCC orders. The OCC order may be indicated by (or depend on) a "cdm-Type", e.g., as indicated in Table 7.4.1.5.3-1 of 3GPP technical specification (TS) 38.211. For example, RS associated with different CDM types may be counted as follows:

"noCDM": counted 1 time
"fd-CDM2": counted 2 times
"cdm4-FD2-TD2": counted 4 times
"cdm8-FD2-TD4": counted 8 times As a second embodiment, the number of RS resources may be based on the number of ports or the lessor of the number of ports and a configured maximum value. For example, the number of times that the corresponding RS is counted may be equal to the number of ports configured for the corresponding CSI-RS. In some embodiments, a maximum value may be introduced. For example, the number of RS resources may be determined by a function such as min(configured maximum value, #CSI-RS ports), where "min" indicates the minimum of the configured maximum value and the number of CSI-RS ports. For example, the configured maximum value may be 8, among various possibilities.

As a third embodiment, the number of RS resources may be based on a standardized number for a given configuration. For example, the number of RS resources may be as indicated in the #RS column of the following table. In other words, the following table may describe the function of the number of ports and other information to determine how many times a RS is counted.

| #RS | Row | Ports X | Density ρ | cdm-Type | $(\bar{k}, \bar{l})$ | CDM group index j | k' | l' |
|---|---|---|---|---|---|---|---|---|
| 1 | 1 | 1 | 3 | noCDM | $(k_0, l_0), (k_0 + 4, l_0), (k_0 + 8, l_0)$ | 0, 0, 0 | 0 | 0 |
| 1 | 2 | 1 | 1, 0.5 | noCDM | $(k_0, l_0),$ | 0 | 0 | 0 |
| 2 | 3 | 2 | 1, 0.5 | fd-CDM2 | $(k_0, l_0),$ | 0 | 0, 1 | 0 |
| 2 | 4 | 4 | 1 | fd-CDM2 | $(k_0, l_0), (k_0 + 2, l_0)$ | 0, 1 | 0, 1 | 0 |
| 2 | 5 | 4 | 1 | fd-CDM2 | $(k_0, l_0), (k_0, l_0 + 1)$ | 0, 1 | 0, 1 | 0 |
| 2 | 6 | 8 | 1 | fd-CDM2 | $(k_0, l_0), (k_1, l_0), (k_2, l_0), (k_3, l_0)$ | 0, 1, 2, 3 | 0, 1 | 0 |
| 2 | 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 4 | 8 | 8 | 1 | cdm4-FD2-TD2 | $(k_0, l_0), (k_1, l_0)$ | 0, 1 | 0, 1 | 0, 1 |
| 2 | 9 | 12 | 1 | fd-CDM2 | $(k_0, l_0), (k_1, l_0), (k_2, l_0),$ $(k_3, l_0), (k_4, l_0), (k_5, l_0)$ | 0, 1, 2, 3, 4, 5 | 0, 1 | 0 |
| 4 | 10 | 12 | 1 | cdm4-FD2-TD2 | $(k_0, l_0), (k_1, l_0), (k_2, l_0)$ | 0, 1, 2 | 0, 1 | 0, 1 |
| 2 | 11 | 16 | 1, 0.5 | fd-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1)$ | 0, 1, 2, 3, 4, 5, 6, 7 | 0, 1 | 0 |
| 4 | 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 2 | 13 | 24 | 1, 0.5 | fd-CDM2 | $(k_0, l_0), (k_1, l_0), (k_2, l_0), (k_0, l_0 + 1),$ $(k_1, l_0 + 1), (k_2, l_0 + 1), (k_0, l_1),$ $(k_1, l_1), (k_2, l_1), (k_0, l_1 + 1), (k_1, l_1 + 1),$ $(k_2, l_1 + 1)$ | 0, 1, 2, 3, 4, 5, 6, 7, 8, 9, 10, 11 | 0, 1 | 0 |
| 4 | 14 | 24 | 1, 0.5 | cdm4-FD2-TD2 | $(k_0, l_0), (k_1, l_0), (k_2, l_0), (k_0, l_1),$ $(k_1, l_1), (k_2, l_1)$ | 0, 1, 2, 3, 4, 5 | 0, 1 | 0, 1 |
| 8 | 15 | 24 | 1, 0.5 | cdm8-FD2-TD2 | $(k_0, l_0), (k_1, l_0), (k_2, l_0)$ | 0, 1, 2 | 0, 1 | 0, 1, 2, 3 |
| 2 | 16 | 32 | 1, 0.5 | fd-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1), (k_0, l_1),$ $(k_1, l_1), (k_2, l_1), (k_3, l_1), (k_0, l_1 + 1),$ $(k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 4 | 17 | 32 | 1, 0.5 | cdm4-FD2-TD2 | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 8 | 18 | 32 | 1, 0.5 | cdm8-FD2-TD4 | $(k_0, l_0), (k_1, l_0), (k_2, l_0), (k_3, l_0)$ | 0, 1, 2, 3 | 0, 1 | 0, 1, 2, 3 |

As a fourth embodiment, the number of RS resources may be based in part on CSI reporting settings (e.g., configuration information received from the network). For example, the number of resources may be based on the following factors: a number of times that a first resource is referenced in the CSI reporting settings; and a number of ports. This may be similar to a counting rule used for link adaptation measurements (e.g., in FG2-33 "CSI-RS and CSI-IM reception for CSI feedback" and described in 3GPP TS 38.214 for link adaptation). Such an approach may apply to one or more of: PL, CBD, L1-RSRP, and/or L1-SINR, among various possibilities. For example, such a counting rule may be constructed based on one or multiple of the following sub-rules:

a) The RS resource may be counted the same regardless of the number of ports for the maximum number of resources UE can process within a slot.

b) Separate capability may be indicated for the maximum number of ports UE can process in addition to the maximum number of resources UE can process within a slot.

c) The RS may be double counted under some circumstances. For example, if a RS is referred N times by one or more CSI Reporting Settings, the RS and the ports configured for the RS are counted N times. For example, when the same RS is configured and associated with two CSI reports, e.g., CSI report 1 and CSI report 2, the RS and the ports configured for the RS are counted two times, one for each CSI report. Thus, if there are two CSI reports and two ports, each RS may be counted as 4 RS resources (e.g., 2 reports*2 ports*1 RS=4 RS resources). In other words, the number of RS resources may be determined based on a product of the number of reports, number of RS, and number of ports configured for the RS.

The UE may transmit one or more message indicating the determined capability and/or related information to the network (e.g., base station) (506), according to some embodiments. Such a message(s) may indicate (e.g., explicitly or implicitly) a number of RS resources that the UE can process for one or more beam management measurement during a period of time. Such a message(s) may indicate (e.g., explicitly or implicitly) related information such as a number of ports associated with the number of RS resources, according to some embodiments. For example, the UE may indicate any assumed or maximum number(s) of ports determined in 506. In some embodiments, a number of ports may not be reported by the UE, e.g., only a number of RS resources may be reported. Such a message(s) may be in response to and/or provided according to any configuration information provided by the network. For example, the indication may be provided in a particular format, message, etc., as indicated by the configuration information. Various examples are described below.

In a first example, the UE may indicate that it supports 2-port RS for candidate beam detection (CBD). The UE may further indicate a number of RS resources supported for 2-port RS for CBD. In some embodiments, UE may indicate that it supports multi-port RS for a different (and/or additional) number of ports and may indicate the corresponding number(s) of RS resources supported. In some embodiments, support for 2-port (or other multi-port) RS for CBD may be implicitly indicated by the UE (and inferred by the network) based on FG2-24, e.g., whether the UE supports 2-port (or multi-port) RS for L1-RSRP measurement.

In a second example, the UE may indicate that it supports multi-port pathloss (PL) measurement. The UE may further indicate a number of RS resources supported for multi-port RS for PL. In some embodiments, the UE may indicate a number of ports associated with the number of RS resources.

In some embodiments, a single indication (e.g., a single capability) may be used for both the first and the second example. In other words, an indication of support for a first number of RS resources for PL measurement may also be interpreted by the network as an indication of support for the first number of RS resources for CBD. In some embodiments, separate indications may be used for these examples.

In a third example, the UE can provide capability indications for any of various purposes (e.g., types of measurement), e.g., including any of the following, among various possibilities: L1-RSRP, L1-signal to interference and noise ratio, CBD, and pathloss. Thus, the UE may report the same or different numbers of RS resources as its capability for any of these measurements. The reported number may depend on a number of ports configured (e.g., for CSI-RS, for a different RS type, and/or for a particular measurement) or an OCC and/or CDM order (e.g., as described above regarding 504). In some embodiments, the UE may further indicate any parameters associated with any reported number of RS resources (e.g., a relevant range or threshold of CDM order, etc.).

In a fourth example, the UE may indicate a maximum number of ports for a particular measurement. For example, the UE may indicate a number of ports for PL measurement. In some embodiments, the UE may not directly indicate a number of RS resources. Thus, by indicating a number of ports, the UE limit the number of ports to which it will de-spread a received RS and thus ensure that its processing capabilities for the PL measurement are not exceeded.

In a fifth example, the UE may indicate a maximum number of RS resources associated with a configured maximum number of ports for a particular measurement. For example, if the network has configured a maximum number of ports for PL measurement, the UE may report a maximum number of RS resources associated with that maximum number of ports.

In a sixth example, the UE may (e.g., separately) indicate a maximum number of ports the UE can process in addition to an associated number of resources. For example, the UE may provide one or more pairs of values, e.g., indicating a pair (or pairs) of number of ports and corresponding number of resources. This may be similar to an approach used for link adaptation measurements. For instance, this sixth example may be used in association with the "fourth embodiment" described above regarding 504, among various possibilities.

The indication of the capability may be indicated in the same or a different message from any related information. Any message type or combination of message types may be used to indicate the capability and/or related information. For example, radio resource control (RRC) signaling or other higher layer signaling may be used. Alternatively, or additionally, one or more media access control (MAC) control element (CE) and/or information element (IE) may be used.

The network may receive the capability indication(s) from the UE.

The network (e.g., base station) may determine a configuration of RS for the UE (508), according to some embodiments. The configuration may be based on the indication(s) of the capability of the UE, a resource counting rule, and/or other configuration information. For example, the network may use any relevant assumption(s), definition(s), counting rule, or other approach indicated in the configuration information or specified in a wireless standard for the UE to use in determining the capability information. In other words, the determination of configuration of RS may be based on the same rules, approach, and/or assumptions as the UE's determination of its capability (e.g., in 504).

The network may determine the configuration of RS so that the number of RS resources for the UE to process does not exceed the UE's capability (e.g., as indicated in 506) during any time period. For example, the network may consider various potential configurations. The network may count a number of RS resources for each slot (or other time period) in a potential configuration and compare the number of RS resources to the capability of the UE, e.g., for the relevant measurement type(s) and/or RS type. If the potential configuration includes a greater number of RS resources (e.g., as counted according to the definitions, counting rule, approach, etc.) than indicated by the UE's capability indication (e.g., in 506), then the network may determine select a different potential configuration (e.g., with a lower number of RS resources, consistent with the UE's capability).

For example, a UE may report one (e.g., potentially only one) number as the UE capability (e.g., in 506) indicating a number of RS resources the UE can process in a slot based on the applicable definitions, counting rule, and/or approach. The network may count resources consistently in determining the configuration. For example, if the UE reports that the UE can process a maximum of 16 RS resources in a slot, and, according to the applicable definitions, counting rule, and/or approach:

a 1 port resource is counted one time; and
a 2 port resource is counted two times, the following two example configurations may be determined by the network, among various possibilities. In a first example, the network may configure the UE to measure 8 1-port resources in a slot and 4 2-port resources in the same slot. To compare with UE capability, both network and UE may count 16 units of reference signal resources in the slot (e.g., 8 1-port resources*1+4 2-port resources*2=16). In a second example, the network may configure the UE to measure 0 1-port resource in a slot and 8 2-port resource in the same slot. To compare with the UE capability, both network and UE may count 16 units of reference signal resources in the slot (e.g., 0 1-port resources*1+8 2-port resources*2=16). Thus, either the first or second example configuration may be determined by the network to be consistent with the UE capability. Thus, the network may determine to use either of the first or second example configurations.

In some embodiments, the configuration may include both link adaptation (LA) and beam management (BM) measurements, e.g., in the same and/or different time periods. For example, the network may consider both RS resources for LA and BM measurements in relation to the UE's capabilities for LA and BM, e.g., which may be indicated separately or together in 506. In some embodiments, RS resources may be shared by LA-CSI and BM-CSI and such shared resources may be counted relative to the UE capabilities for either or both of LA and BM. In other words, in determining the configuration, both LA and BM may be considered with respect to the UE's capabilities.

In some embodiments, BM may be considered separately from LA. For example, BM measurements may be scheduled during different slots or other time periods than LA.

In some embodiments, the network may consider all of the RS that will occur during the time period. Various types of RS may be scheduled to occur in multiple, overlapping time periods. Accordingly, the duration of the different RS may be considered. The duration of the RS resource may be counted as follows:

For an aperiodic resource, the resource may be counted in every slot starting from the end of the physical downlink control channel (PDCCH) containing the triggering request and ending at the end of the physical uplink control channel (PUSCH) containing the report associated with this aperiodic resource.

For a semi-persistent resource, the resource may be counted in every slot starting from the end of when an activation command is applied, and ending at the end of when the deactivation command is applied.

For a periodic resource, the resource may be counted in every slot starting when the periodic CSI-RS is configured by higher layer signaling, and ending when the periodic CSI-RS configuration is released.

The network (e.g., base station) may transmit an indication of the configuration of RS to the UE (510), according to some embodiments. The indication may be or include an indication of RS resources to use for one or more BM measurements using multiple ports, among various possibilities.

The network (e.g., base station) may transmit RS to the UE (512), according to some embodiments. The RS may be transmitted according to the configuration of RS. The RS may be transmitted using multiple ports.

The UE may receive the RS and perform measurements using the RS (514), according to some embodiments. For example, the UE may perform one or more BM measurements according to the configuration.

The UE and the network (e.g., base station) may perform communication (516), according to some embodiments. For example, the UE may transmit one or more reports or indications of results of the measurements (e.g., of 514) to the network. For example, the UE may report an indication of beam failure detection, detection of a candidate beam (e.g., CBD), PL, L1-RSRP, L1-SINR, new beam identification, new beam identification across frequency ranges, etc. The UE and the network may use one or more beams selected or adjusted based on the measurements.

Additional Information and Embodiments

In some embodiments, an apparatus may comprise: a processor configured to cause a user equipment device (UE) to: establish communication with a base station; report, to the base station, an indication of a capability for the maximum number of reference signals that UE can process during a period of time; receive, from the base station, configuration of reference signals with different number of port that UE needs to process during a period of time, wherein the base station ensures that the configured number of reference signals does not exceed the UE reported capability.

In some embodiments, to compute a total number of reference signals resources, a UE and/or network may determine a first number of reference signal resources during an amount of time using a single port; determine a second number of reference signal resources during the amount of time using a third number of ports, wherein the second number is different than the first number is and is determined based on a function of the third number of ports.

In some embodiments, an apparatus may comprise: a processor configured to cause a base station to: establish communication with a user equipment device (UE); receive, from the UE, an indication of a capability of the UE for the maximum number of reference signals that UE can process during a period of time; determine a configuration of reference signals with different number of port that UE needs to process during a period of time to ensure that the configured number of reference signals does not exceed the UE reported capability.

In a first set of embodiments, an apparatus, may comprise: a processor configured to cause a user equipment device (UE) to: establish communication with a base station; determine a first number of reference signal resources that the UE is capable of processing during an amount of time for a beam management measurement using a second number of ports, wherein the first number of reference signal resources is determined based on a function of the second number of ports and is different than a third number of reference signal resources that the UE is capable of processing during the amount of time for the beam management measurement using a single port; transmit, to the base station, an indication of the first number of reference signal resources; receive, from the base station, configuration information for the beam management measurement using the second number of ports; receive, from the base station, a reference signal using the second number of ports; and perform the beam management measurement based on the reference signal.

In some embodiments, the function of the second number of ports is based on an orthogonal cover code order.

In some embodiments, the orthogonal cover code order is based on a product of a frequency domain orthogonal cover code order and a time domain orthogonal cover code order.

In some embodiments, the orthogonal cover code order is based on a code division multiplexing type.

In some embodiments, if the code division multiplexing type indicates no code division multiplexing, then a respective reference signal resource is counted a single time in the determination of the first number; and if the code division multiplexing type indicates code division multiplexing, then the respective reference signal resource is counted multiple times in the determination of the first number.

In some embodiments, according to the function of the second number of ports, the first number is equal to the second number of ports.

In some embodiments, according to the function, the first number is equal to a lessor of: the second number of ports; and a configured maximum value.

In some embodiments, the beam management measurement includes one or more of: layer 1 signal to interference and noise ratio measurement; or beam measurement based on a synchronization signal block or channel state information reference signal.

In some embodiments, the processor is further configured to cause the UE to: receive, from the base station, configuration information, the configuration information comprising channel state information (CSI) reporting settings, wherein the function is based on: a number of times that a first resource is referenced in the CSI reporting settings; and the second number of ports.

In some embodiments, the beam management measurement includes pathloss measurement.

In some embodiments, the beam management measurement includes one or more of: beam failure detection; radio link monitoring; new beam identification; Layer 1 RSRP (L1-RSRP) measurement; Layer 1 SINR (L1-SINR) measurement; and path loss measurement.

In some embodiments, according to the function, the first number is as indicated in the #RS column of the table presented above with respect to the discussion of 504.

In a second set of embodiments, an apparatus, may comprise: a processor configured to cause a base station to: establish communication with a user equipment device (UE); receive, from the UE, a message including an indication of a capability of the UE for the maximum number of reference signals that the UE can process during a period of time using a single port; determine a configured number of reference signals using a larger number of ports that the UE can process during the period of time, wherein the determination of the configured number of reference signals is based on the indication and a function of the larger number of ports, wherein the larger number of ports is greater than one; and transmit the configured number of reference signals to the UE during the period of time.

In some embodiments, the processor may be further configured to cause the base station to: receive, from the UE a report of a first beam management measurement based on the configured number of reference signals to the UE during the period of time.

In some embodiments, the determination of the configured number of reference signals is further based on an indication that the UE supports performing layer 1 reference signal received power measurements using at least two ports.

In some embodiments, the first beam management measurement is a pathloss measurement, wherein the processor is further configured to cause the base station to: determine a second configured number of reference signals using the larger number of ports, wherein the second configured number of reference signals is associated with candidate beam detection.

In some embodiments, the message further includes an indication that the UE supports candidate beam detection measurements using more than one port.

In some embodiments, the larger number of ports is a maximum number of ports for a pathloss measurement.

In a third set of embodiments, a user equipment device (UE), may comprise: a radio; and a processor operably connected to the radio and configured to cause the UE to: establish communication with a base station; determine: a first number of reference signal resources that the UE is capable of processing during an amount of time for a beam management measurement; and a second number of ports that the UE is capable of processing during the amount of time for the beam management measurement, wherein the second number is greater than one; transmit, to the base station: an indication of the first number of reference signal resources; and an indication of the second number of ports; receive, from the base station, a reference signal using the second number of ports; and perform the beam management measurement based on the reference signal.

In some embodiments, the beam management measurement includes one or more of: pathloss measurement; beam failure detection; radio link monitoring; Layer 1 RSRP (L1-RSRP) measurement; Layer 1 SINR (L1-SINR) measurement; and path loss measurement.

In various embodiments, various combinations of the embodiments described above may be combined together.

Yet another exemplary embodiment may include a method, comprising: by a wireless device: performing any or all parts of the preceding examples.

Another exemplary embodiment may include a wireless device, comprising: an antenna; a radio coupled to the antenna; and a processing element operably coupled to the radio, wherein the device is configured to implement any or all parts of the preceding examples.

Still another exemplary embodiment may include an apparatus, comprising: a processing element configured to cause a wireless device to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Any of the methods described herein for operating a user equipment (UE) may be the basis of a corresponding method for operating a base station, by interpreting each message/signal X received by the UE in the DL as message/signal X transmitted by the base station, and each message/signal Y transmitted in the UL by the UE as a message/signal Y received by the base station. Moreover, a method described with respect to a base station may be interpreted as a method for a UE in a similar manner.

In addition to the above-described exemplary embodiments, further embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or 107) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus, comprising:
a processor configured to cause a user equipment device (UP to:
   establish communication with a base station;
   determine a first number of reference signal resources that the UE is capable of processing during an amount of time for a beam management measurement using a second number of ports, wherein the first number of reference signal resources is determined based on a function of the second number of ports and is different than a third number of reference signal resources that the UE is capable of processing during the amount of time for the beam management measurement using a single port;
   transmit, to the base station, an indication of the first number of reference signal resources;
   receive, from the base station, configuration information for the beam management measurement using the second number of ports;
   receive, from the base station, a reference signal using the second number of ports; and
   perform the beam management measurement based on the reference signal.

2. The apparatus of claim 1, wherein the function of the second number of ports is based on an orthogonal cover code order.

3. The apparatus of claim 2, wherein the orthogonal cover code order is based on a product of a frequency domain orthogonal cover code order and a time domain orthogonal cover code order.

4. The apparatus of claim 2, wherein the orthogonal cover code order is based on a code division multiplexing type.

5. The apparatus of claim 4, wherein:
if the code division multiplexing type indicates no code division multiplexing, then a respective reference signal resource is counted a single time in the determination of the first number; and
if the code division multiplexing type indicates code division multiplexing, then the respective reference signal resource is counted multiple times in the determination of the first number.

6. The apparatus of claim 1, wherein, according to the function of the second number of ports, the first number is equal to the second number of ports.

7. The apparatus of claim 1, wherein, according to the function, the first number is equal to a lessor of:
the second number of ports; and
a configured maximum value.

8. The apparatus of claim 1, wherein the beam management measurement includes one or more of:
layer 1 signal to interference and noise ratio measurement; or
beam measurement based on a synchronization signal block or channel state information reference signal.

9. The apparatus of claim 1, wherein the processor is further configured to cause the UE to:
receive, from the base station, configuration information, the configuration information comprising channel state information (CSI) reporting settings, wherein the function is based on:
   a number of times that a first resource is referenced in the CSI reporting settings; and
   the second number of ports.

10. The apparatus of claim 1, wherein the beam management measurement includes pathloss measurement.

11. The apparatus of claim 1, wherein the beam management measurement includes one or more of:
beam failure detection;
radio link monitoring;
new beam identification;
Layer 1 RSRP (L1-RSRP) measurement;
Layer 1 SINR (L1-SINR) measurement; and
path loss measurement.

12. The apparatus of claim 1, wherein, according to the function, the first number is as indicated in the #RS column of the following table:

| #RS | Row | Ports X | Density ρ | cdm-Type | $(\bar{k}, \bar{l})$ | CDM group index j | k' | l' |
|---|---|---|---|---|---|---|---|---|
| 1 | 1 | 1 | 3 | noCDM | $(k_0, l_0), (k_0 + 4, l_0), (k_0 + 8, l_0)$ | 0, 0, 0 | 0 | 0 |
| 1 | 2 | 1 | 1, 0.5 | noCDM | $(k_0, l_0)$, | 0 | 0 | 0 |
| 2 | 3 | 2 | 1, 0.5 | fd-CDM2 | $(k_0, l_0)$, | 0 | 0, 1 | 0 |
| 2 | 4 | 4 | 1 | fd-CDM2 | $(k_0, l_0), (k_0 + 2, l_0)$ | 0, 1 | 0, 1 | 0 |
| 2 | 5 | 4 | 1 | fd-CDM2 | $(k_0, l_0), (k_0, l_0 + 1)$ | 0, 1 | 0, 1 | 0 |
| 2 | 6 | 8 | 1 | fd-CDM2 | $(k_0, l_0), (k_1, l_0), (k_2, l_0), (k_3, l_0)$ | 0, 1, 2, 3 | 0, 1 | 0 |
| 2 | 7 | 8 | 1 | fd-CDM2 | $(k_0, l_0), (k_1, l_0), (k_0, l_0 + 1), (k_1, l_0 + 1)$ | 0, 1, 2, 3 | 0, 1 | 0 |
| 4 | 8 | 8 | 1 | cdm4-FD2-TD2 | $(k_0, l_0), (k_1, l_0)$ | 0, 1 | 0, 1 | 0, 1 |
| 2 | 9 | 12 | 1 | fd-CDM2 | $(k_0, l_0), (k_1, l_0), (k_2, l_0),$ $(k_3, l_0), (k_4, l_0), (k_5, l_0)$ | 0, 1, 2, 3, 4, 5 | 0, 1 | 0 |
| 4 | 10 | 12 | 1 | cdm4-FD2-TD2 | $(k_0, l_0), (k_1, l_0), (k_2, l_0)$ | 0, 1, 2 | 0, 1 | 0, 1 |
| 2 | 11 | 16 | 1, 0.5 | fd-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1)$ | 0, 1, 2, 3, 4, 5, 6, 7 | 0, 1 | 0 |
| 4 | 12 | 16 | 1, 0.5 | cdm4-FD2-TD2 | $(k_0, l_0), (k_1, l_0), (k_2, l_0), (k_3, l_0)$ | 0, 1, 2, 3 | 0, 1 | 0, 1 |
| 2 | 13 | 24 | 1, 0.5 | fd-CDM2 | $(k_0, l_0), (k_1, l_0), (k_2, l_0), (k_0, l_0 + 1),$ $(k_1, l_0 + 1), (k_2, l_0 + 1), (k_0, l_1),$ $(k_1, l_1), (k_2, l_1), (k_0, l_1 + 1), (k_1, l_1 + 1),$ $(k_2, l_1 + 1)$ | 0, 1, 2, 3, 4, 5, 6, 7, 8, 9, 10, 11 | 0, 1 | 0 |
| 4 | 14 | 24 | 1, 0.5 | cdm4-FD2-TD2 | $(k_0, l_0), (k_1, l_0), (k_2, l_0), (k_0, l_1),$ $(k_1, l_1), (k_2, l_1)$ | 0, 1, 2, 3, 4, 5 | 0, 1 | 0, 1 |
| 8 | 15 | 24 | 1, 0.5 | cdm8-FD2-TD2 | $(k_0, l_0), (k_1, l_0), (k_2, l_0)$ | 0, 1, 2 | 0, 1 | 0, 1, 2, 3 |
| 2 | 16 | 32 | 1, 0.5 | fd-CDM2 | $(k_0, l_0), (k_1, l_0), (k_2, l_0),$ $(k_3, l_0), (k_0, l_0 + 1), (k_1, l_0 + 1),$ $(k_2, l_0 + 1), (k_3, l_0 + 1), (k_0, l_1),$ $(k_1, l_1), (k_2, l_1), (k_3, l_1), (k_0, l_1 + 1),$ $(k_1, l_1 + 1), (k_2, l_1 + 1), (k_3, l_1 + 1)$ | 0, 1, 2, 3, 4, 5, 6, 7, 8, 9, 10, 11, 12, 13, 14, 15 | 0, 1 | 0 |
| 4 | 17 | 32 | 1, 0.5 | cdm4-FD2-TD2 | $(k_0, l_0), (k_1, l_0), (k_2, l_0), (k_3, l_0),$ $(k_0, l_1), (k_1, l_1), (k_2, l_1), (k_3, l_1)$ | 0, 1, 2, 3, 4, 5, 6, 7 | 0, 1 | 0, 1 |
| 8 | 18 | 32 | 1, 0.5 | cdm8-FD2-TD4 | $(k_0, l_0), (k_1, l_0), (k_2, l_0), (k_3, l_0)$ | 0, 1, 2, 3 | 0, 1 | 0, 1, 2, 3. |

13. An apparatus, comprising:
a processor configured to cause a base station to:
establish communication with a user equipment device (UE);
receive, from the UE, a message including an indication of a capability of the LIE for the maximum number of reference signals that the UE can process during a period of time using a single port;
determine a configured number of reference signals using a larger number of ports that the UE can process during the period of time, wherein the determination of the configured number of reference signals is based on the indication and a function of the larger number of ports, wherein the larger number of ports is greater than one; and
transmit the configured number of reference signals to the UE during the period of time.

14. The apparatus of claim 13, wherein the processor is further configured to cause the base station to:
receive, from the UE a report of a first beam management measurement based on the configured number of reference signals to the UE during the period of time.

15. The apparatus of claim 14, wherein the determination of the configured number of reference signals is further based on an indication that the UE supports performing layer 1 reference signal received power measurements using at least two ports.

16. The apparatus of claim 14, wherein the first beam management measurement is a pathloss measurement, wherein the processor is further configured to cause the base station to
determine a second configured number of reference signals using the larger number of ports, wherein the second configured number of reference signals is associated with candidate beam detection.

17. The apparatus of claim 13, wherein the message further includes an indication that the UE supports candidate beam detection measurements using more than one port.

18. The apparatus of claim 13, wherein the larger number of ports is a maximum number of ports for a pathloss measurement.

19. A user equipment device (LIE), comprising:
a radio; and
a processor operably connected to the radio and configured to cause the UE to:
establish communication with a base station;
determine:
a first number of reference signal resources that the UE is capable of processing during an amount of time for a beam management measurement, and a second number of ports that the UE is capable of processing during the amount of time for the beam management measurement, wherein the second number is greater than one;

transmit, to the base station:
   an indication of the first number of reference signal resources; and
   an indication of the second number of ports;

receive, from the base station a reference signal using the second number of ports; and perform the beam management measurement based on the reference signal.

20. The UE of claim 19, wherein the beam management measurement includes one or more of:
   beam failure detection;
   radio link monitoring;
   Layer 1 RSRP (L1-RSRP) measurement;
   Layer 1 SINR (L1-SINR) measurement; and
   path loss measurement.

* * * * *

UNITED STATES PATENT AND TRADEMARK OFFICE
CERTIFICATE OF CORRECTION

PATENT NO. : 12,010,055 B2  
APPLICATION NO. : 17/437750  
DATED : June 11, 2024  
INVENTOR(S) : Haitong Sun Page 1 of 1

It is certified that error appears in the above-identified patent and that said Letters Patent is hereby corrected as shown below:

In the Claims

Column 24, Line 7, Claim 1, delete "(UP" and insert --(UE)--.
Column 25, Line 53, Claim 13, delete "LIE" and insert --UE--.
Column 26, Line 59, Claim 19, delete "(LIE)" and insert --(UE)--.

Signed and Sealed this
Seventeenth Day of September, 2024

Katherine Kelly Vidal
*Director of the United States Patent and Trademark Office*